United States Patent
Mercuri et al.

(10) Patent No.: US 6,923,631 B2
(45) Date of Patent: Aug. 2, 2005

(54) APPARATUS FOR FORMING A RESIN IMPREGNATED FLEXIBLE GRAPHITE SHEET

(75) Inventors: Robert Angelo Mercuri, Seven Hills, OH (US); Joseph Paul Capp, Strongsville, OH (US); Michael Lee Warddrip, Parma, OH (US); Thomas William Weber, Cleveland, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 165 days.

(21) Appl. No.: 09/906,281

(22) Filed: Jul. 16, 2001

(65) Prior Publication Data

US 2001/0041253 A1 Nov. 15, 2001

Related U.S. Application Data

(62) Division of application No. 09/548,118, filed on Apr. 12, 2000, now Pat. No. 6,432,336.

(51) Int. Cl.$^7$ .............................................. B29C 59/04
(52) U.S. Cl. ..................... 425/80.1; 425/83.1; 425/335; 425/371
(58) Field of Search ................................ 425/80.1, 83.1, 425/335, 371; 264/122, 80, 50

(56) References Cited

U.S. PATENT DOCUMENTS

| | | | | |
|---|---|---|---|---|
| 1,191,383 A | * | 7/1916 | Aylsworth | 264/29.1 |
| 3,404,061 A | * | 10/1968 | Shane et al. | 264/109 |
| 3,492,197 A | * | 1/1970 | Olstowski et al. | 264/29.1 |
| 4,524,154 A | * | 6/1985 | Maeda et al. | 264/53 |
| 4,895,713 A | * | 1/1990 | Greinke et al. | 423/448 |
| 4,946,892 A | * | 8/1990 | Chung | 264/291 |
| 5,846,459 A | * | 12/1998 | Mercuri | 264/122 |
| 6,217,800 B1 | * | 4/2001 | Hayward | 264/109 |
| 6,287,694 B1 | * | 9/2001 | Zaleski et al. | 423/448 |
| 6,503,626 B1 | * | 1/2003 | Norley et al. | 264/119 |

* cited by examiner

*Primary Examiner*—James P. Mackey
*Assistant Examiner*—Thu Khanh T. Nguyen
(74) *Attorney, Agent, or Firm*—Waddey & Patterson, P.C.; James R. Cartiglia

(57) ABSTRACT

A flexible graphite sheet exhibiting enhanced isotropy is provided. In addition, an apparatus, system and method for continuously producing a resin-impregnated flexible graphite sheet is also provided.

1 Claim, 6 Drawing Sheets

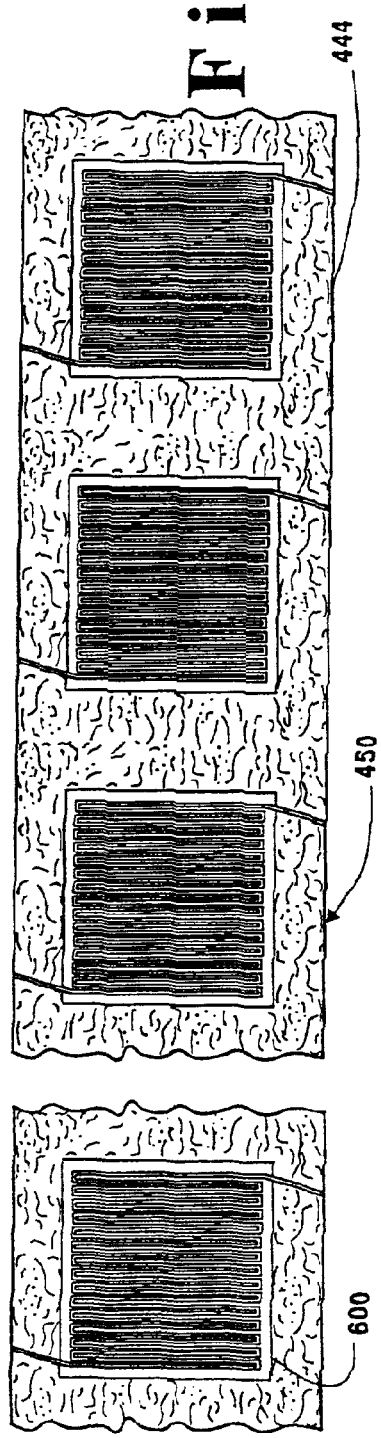
Fig. 5A
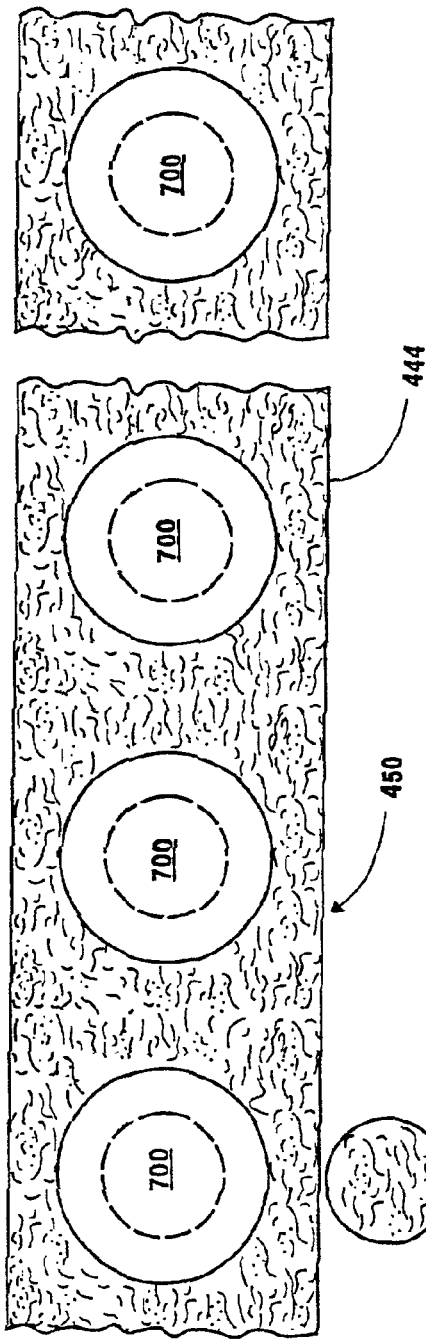
Fig. 5B
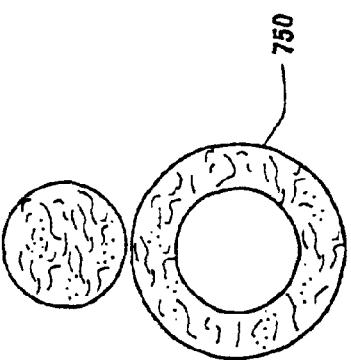

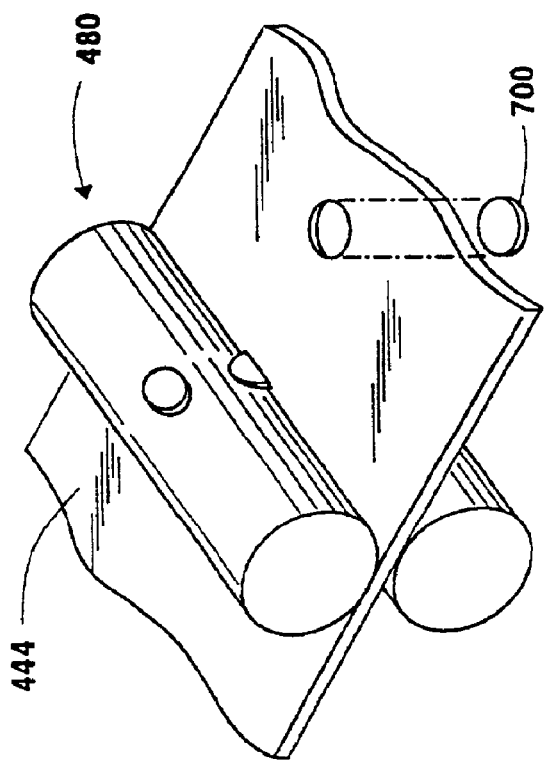
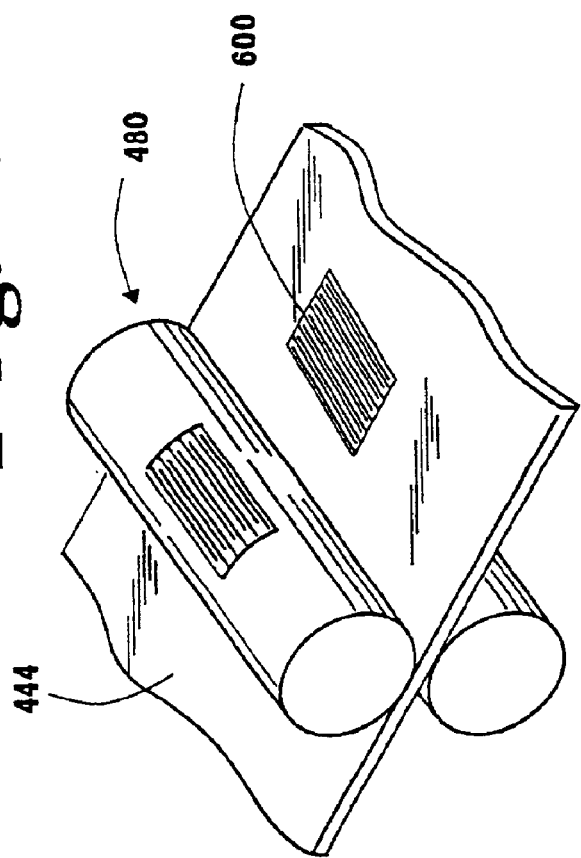

APPARATUS FOR FORMING A RESIN IMPREGNATED FLEXIBLE GRAPHITE SHEET

RELATED APPLICATION

This application is a divisional of our prior U.S. patent application Ser. No. 09/548,118 entitled "Flexible Graphite Article and Method of Manufacture" filed Apr. 12, 2000, now U.S. Pat. No. 6,432,336.

TECHNICAL FIELD

The present invention relates to planar flexible graphite articles, such as flexible graphite sheet, and to a system and method for continuously producing such articles. More particularly, the present invention relates to flexible graphite sheet material that exhibits enhanced isotropy with respect to thermal and electrical conductivity and fluid diffusion, as well as to a method for producing the sheet.

BACKGROUND OF THE INVENTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional, e.g., thermal and electrical conductivity and fluid diffusion. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The natural graphites suitable for manufacturing flexible graphite possess a very high degree of orientation.

As noted above, the bonding forces holding the parallel layers of carbon atoms together are only weak van der Waals forces. Graphites, especially natural graphites, can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

Natural graphite flake which has been expanded and more particularly expanded so as to have a final thickness or "c" direction dimension which is at least about 80 or more times the original "c" direction dimension can be formed without the use of a binder into cohesive or integrated sheets, e.g., webs, papers, strips, tapes, or the like. The formation of graphite particles which have been expanded to have a final thickness or "c" dimension which is at least 80 times the original "c" direction dimension into integrated sheets by compression, without the use of any binding material is possible. It is believed that this is due to the excellent mechanical interlocking, or cohesion that is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, such as roll pressing. Sheet material thus produced has excellent flexibility, good strength and a very high degree of orientation.

Briefly, the process of producing flexible, binderless anisotropic graphite sheet material comprises compressing or compacting under a predetermined load and preferably in the absence of a binder, expanded graphite particles which have a "c" direction dimension which is at least 80 times that of the original particles so as to form a substantially flat, flexible, integrated graphite sheet. The expanded graphite particles are generally worm-like or vermiform in appearance, and once compressed, will maintain the compression set and alignment with the opposed major surfaces of the sheet. The density and thickness of the sheet material can be varied by controlling the degree of compression. The density of the sheet material can be within the range of from about 5 pounds per cubic foot to about 125 pounds per cubic foot. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e., along or parallel to the opposed, major surfaces comprises the "a" directions and the thermal, electrical and fluid diffusion properties of the sheet are very different, by orders of magnitude, for the "c" and "a" directions.

This very considerable difference in properties, i.e., anisotropy, which is directionally dependent, can be disadvantageous in some applications. For example, in gasket applications where flexible graphite sheet is used as the gasket material and in use is held tightly between metal surfaces, the diffusion of fluid like gases or liquids occurs more readily parallel to and between the major surfaces of the flexible graphite sheet. It would, in most instances, provide for greater gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and very substantially less in the direction parallel to and between the major faces of the flexible graphite sheet ("a" direction). In applications such as seals or other components (such as fluid flow field plates or gas diffusion layers) of fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the upper and lower surfaces of the flexible graphite sheet is relatively high, while it is relatively very low in the "c" direction transverse to the upper and lower surfaces. At times, and in certain applications, such as thermal interfaces, it may be desirable to increase the thermal conductivity of the sheet in the "c" direction.

In some applications, it is important to incorporate additives in the flexible graphite sheet in order to achieve corrosion resistance and to impregnate the flexible graphite sheet with resins and/or other material to increase the strength and water resistance of the flexible graphite sheet. Also, it is important at times to provide such additives in the course of processing the natural graphite into flexible graphite.

These foregoing situations are accommodated by the present invention.

SUMMARY OF THE INVENTION

In accordance with the present invention, a flexible graphite article in the form of a sheet having opposed, relatively planar, major surfaces is provided. The article is formed of particles of expanded (or exfoliated) graphite, an optically detectable portion of which, at magnifications of 100× or less, are substantially unaligned with the opposed planar major surfaces of the flexible graphite article. Preferably, at least a portion of the unaligned particles are transverse to the opposed major surfaces of the article. The flexible graphite article is characterized by having decreased electrical resistivity and increased thermal conductivity in a direction transverse to the opposed planar major surfaces of the flexible graphite sheet and increased resistance to fluid flow in a direction parallel to the opposed planar major faces of the flexible graphite sheet. The flexible graphite sheet, with or without additives and/or impregnants, can be mechanically altered, such as by embossing, die molding and cutting to form components for electrochemical fuel cells, gaskets and heat conducting and heat resistant articles.

The present invention also includes an apparatus, system and method for producing flexible graphite sheet articles, such as those having decreased electrical resistivity and increased thermal conductivity in a direction transverse to the opposed planar major surfaces of the flexible graphite sheet and increased resistance to fluid flow in a direction parallel to the opposed planar major faces of the flexible graphite sheet.

The inventive method comprises reacting raw graphite particles with a liquid intercalant solution to form intercalated graphite particles; exposing the intercalated graphite particles to a temperature of at least about 700° C. to expand the intercalated graphite particles to form a stream of exfoliated graphite particles; continuously compressing the stream of exfoliated graphite particles into a continuous coherent self-supporting mat of flexible graphite; continuously contacting the flexible graphite mat with liquid resin and impregnating the mat with liquid resin; and continuously calendering the flexible graphite mat to increase the density thereof to form a continuous flexible graphite sheet having a density of from about 5 to about 125 lbs/ft$^3$ and a thickness of from about 1.0 to 0.003 inches.

The method also advantageously includes mechanically deforming a surface of the continuous flexible graphite sheet to provide a series of repeating patterns on a surface of the flexible graphite sheet or the removal of material from the flexible graphite sheet in a series of repeating patterns and vaporizing at least some of the solvent from the resin prior to mechanically deforming a surface of the continuous flexible graphite sheet.

As noted, the present invention also includes an apparatus for the continuous production of resin-impregnated flexible graphite sheet, comprising a reactor vessel for containing as reactants graphite particles in mixture with a liquid intercalant solution to form intercalated graphite particles; an expansion chamber in operative connection with the reactor vessel, the interior of the expansion chamber being at a temperature of at least about 700° C. (and preferably enclosing an open flame), such that passing intercalated graphite particles from the reactor vessel to the expansion chamber causes expansion of the intercalated graphite particles to form exfoliated graphite particles; a compression station positioned to receive exfoliated graphite particles for compressing such particles into a coherent self-supporting mat of flexible graphite; an impregnation chamber for contacting the flexible graphite mat with liquid resin and impregnating the mat with the liquid resin; a calender mill disposed to receive the flexible graphite mat for increasing the density of the mat to form a continuous flexible graphite sheet preferably having a density of from about 5 to about 125 lbs/ft$^3$ and a thickness of no more than about 1.0 inches, more preferably about 1.0 to about 0.003 inches.

The inventive apparatus also preferably includes a device for mechanically deforming a surface of the continuous flexible graphite sheet to provide a series of repeating patterns on a surface of the flexible graphite sheet or the removal of material from the flexible graphite sheet in a series of repeating patterns. It further advantageously has an oven for receiving the mat from the device for mechanically deforming a surface of the continuous flexible graphite sheet, to cure the resin with which the continuous flexible graphite sheet is impregnated.

In a particular embodiment of the invention, a system for the continuous production of surface patterned, resin-impregnated flexible graphite sheet is presented. The system includes:

(i) a reactor vessel for containing as reactants raw natural graphite flake-like particles in mixture with sulfuric and nitric acids;

(ii) an acid containing vessel communicating with said reactor vessel for the introduction of a mixture of sulfuric and nitric acid into said reactor vessel;

(iii) a graphite particle containing vessel for the introduction of graphite particles into the reactor vessel;

(iv) a first additive containing vessel communicating with said reactor vessel for the introduction of intercalation enhancing materials, acids or organic chemicals;

(v) a wash vessel containing water communicating with the reactor vessel to receive reaction product in the form of acid intercalated graphite particles and remove acid from the surface of the acid intercalated graphite particles and a portion of the mineral impurities contained in the natural graphite particles introduced into the reactor vessel;

(vi) a drying chamber for drying washed acid intercalated graphite particles;

(vii) conduit means extending from said wash vessel to said drying chamber for passing washed acid intercalated graphite particles from the wash vessel to the drying chamber;

(viii) a second additive containing vessel communicating with the conduit means of (vii) for adding pollution reducing chemicals to the washed, intercalated graphite particles to the washed acid intercalated graphite particles;

(ix) a collecting vessel for collecting washed acid intercalated graphite particles admixed with pollution reducing chemicals;

(x) conduit means extending from said drying chamber to said collecting vessel for passing acid intercalated graphite particles admixed with acid additives from said drying chamber to said collecting vessel;

(xi) a third additive containing vessel communicating with said conduit of (x) for the introduction of ceramic fiber particles in the form of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like into said conduit and the admixing and entrainment thereof with acid intercalated graphite particles passing from the washing vessel to the drying chamber;

(xii) an expansion chamber enclosing an open flame at a temperature of 800 to 1300° C.;

(xiii) conduit means extending from said collecting vessel to said expansion chamber for passing dried acid intercalated graphite particles admixed with ceramic particles to said expansion chamber;

(xiv) gas inlet means communicating with the conduit means of (xii) for entraining the acid intercalated graphite particles admixed with ceramic particles in a stream of non-reactive gas and passing the entrained acid intercalated graphite particles admixed with ceramic particles into the open flame enclosed in said expansion chamber to cause expansion of the acid intercalated graphite particles of at least about 80 times to form vermiform elongated graphite particles;

(xv) a collecting hopper for receiving said vermiform elongated graphite particles admixed with ceramic particles;

(xvi) a separator vessel interposed between the expansion chamber and the collecting hopper to collect by gravity separation heavy solid mineral impurity particles from the mixture of vermiform graphite particles with ceramic particles;

(xvii) a gas scrubber communicating with said collecting hopper to collect gases generated in the expansion chamber;

(xviii) a compression chamber positioned to receive vermiform graphite particles mixed with ceramic fiber particles for compressing said vermiform particles mixed with ceramic particles into a coherent self-supporting mat of flexible graphite from about 1 to about 0.015 inches in thickness and having a density of from about 5 to about 25 lbs./ft.$^3$;

(xix) an impregnation chamber for contacting the flexible graphite mat of (xviii) with liquid resin and impregnating said flexible graphite with liquid resin;

(xx) a dryer disposed to receive the impregnated flexible graphite mat of (xix) and heat and dry said mat;

(xxi) a calender mill disposed to receive the flexible graphite mat of (xix) for increasing the density of said flexible graphite mat to form a continuous flexible graphite sheet having a density of from about 5 to about 80 lbs/ft$^3$, a thickness of from about 0.5 to about 0.005 inches and relatively evenly spaced apart opposite surfaces;

(xxii) a device for mechanically deforming a surface of the continuous flexible graphite sheet of (xxi) to provide a series of repeating patterns on said surface flexible graphite sheet or the removal of material from said flexible graphite sheet in a series of repeating patterns; and (xxiii) an oven for receiving the mat from the dryer of (xxii) to cure the resin the mat.

BRIEF DESCRIPTION OF THE DRAWINGS

FIGS. 5(A) and 5(B) show different types of the flexible graphite articles noted above; and FIGS. 5(C) and 5(D) show conventional mechanisms for producing different types of flexible graphite articles noted above.

DETAILED DESCRIPTION OF THE PREFERRED EMBODIMENT

Figure 1:
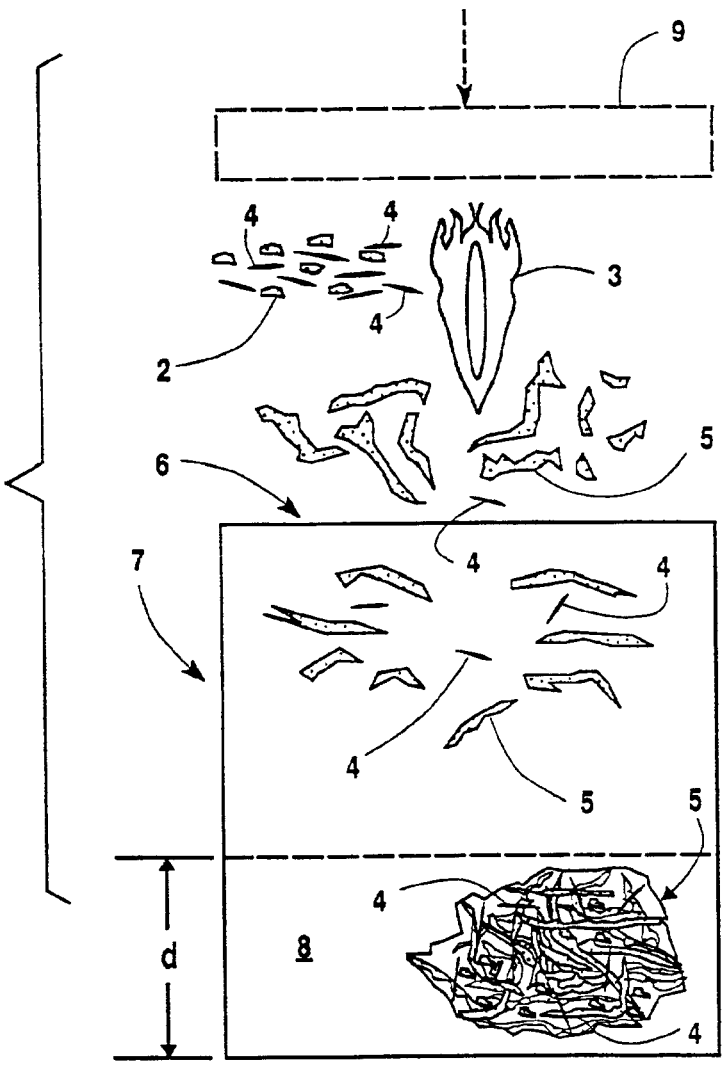
FIGS. 1, 1(A) show the making of a mass of un-aligned expanded graphite particles.

Graphite is a crystalline form of carbon comprising atoms covalently bonded in flat layered planes with weaker bonds between the planes. By treating particles of graphite, such as natural graphite flake, with an intercalant of, e.g., a solution of sulfuric and nitric acid, the crystal structure of the graphite reacts to form a compound of graphite and the intercalant. The treated particles of graphite are often referred to as "particles of intercalated graphite." Upon exposure to high temperature, the particles of intercalated graphite expand in dimension as much as about 80 or more times its original volume in an accordion-like fashion in the "c" direction, i.e., in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes.

A common method for manufacturing graphite sheet or foil is described by Shane et al. in U.S. Pat. No. 3,404,061, the disclosure of which is incorporated herein by reference. In the typical practice of the Shane et al. method, natural graphite flakes are intercalated by dispersing the flakes in a solution containing an oxidizing agent of, for instance, a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In a preferred embodiment, the intercalating agent is a solution of a mixture of sulfuric acid, or sulfuric acid and phosphoric acid, and an oxidizing agent like nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes and the flakes are water-washed. The quantity of intercalation solution retained on the flakes after draining may range from 20 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713, the disclosure of which is also herein incorporated by reference.

Referring now to FIG. 1, intercalated graphite flakes are advantageously exfoliated into flexible graphite particles by passing a stream of intercalated graphite flakes 2 through a flame 3 for only a few seconds at temperature up to or greater than 700° C., more typically 1000° C. or higher, to exfoliate, i.e. expand the particles, and a resulting stream of expanded graphite particles, or worms 5, are passed to the top 6 of a large open-topped vessel 7 into which the particles fall freely and are randomly dispersed. From about 1–30% by weight of ceramic additives, indicated at 4, can be blended with the intercalated graphite flakes 2 to provide enhanced properties in the final flexible graphite product. The additives include ceramic fiber particles having a length of 0.15 to 1.5 millimeters. The width of the particles is suitably from 0.04 to 0.004 mm. The ceramic fiber particles are non-reactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

Figure 1A:
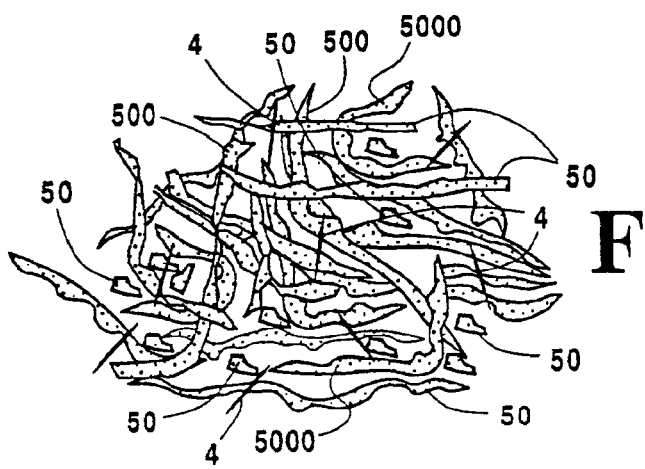

The dispersed expanded particles 5, with optional additive 4, are collected and confined in the large open-topped vessel as a layer 8 of pre-determined depth "d" and are to a large extent omnidirectionally oriented, with some horizontally aligned, as shown at 50 in FIG. 1(A), and many extending in other directions, including vertically as shown at 500 in FIG. 1(A), and in various directions other than vertical or horizontal as shown as 5000 in FIG. 1(A). The large open-topped vessel used to collect the omnidirectionally oriented particles can be in the form of a mold as shown at 7 shaped to receive a die 9 which is used to compress the layer 8 of omnidirectionally oriented exfoliated graphite particles 50, 500, 5000 to a density of from about 0.1 to 25 pounds per cubic foot at a thickness of from 25 to 0.15 inches. Under these conditions, the omnidirectional orientation of the exfoliated acid treated graphite is conserved to a substantial extent in the compressed planar flexible graphite article 100, having parallel opposed faces or major surfaces 101, 103, as shown in the sketch of the edge of the planar article illustrated in FIG. 2 and is also conserved when the material of FIG. 2 is pressed into sheet having a density of 25 to 100 pounds per cubic foot and a thickness of 0.15 to 0.04 inch as shown in the similar sketch of FIG. 2(A).

Figure 4:
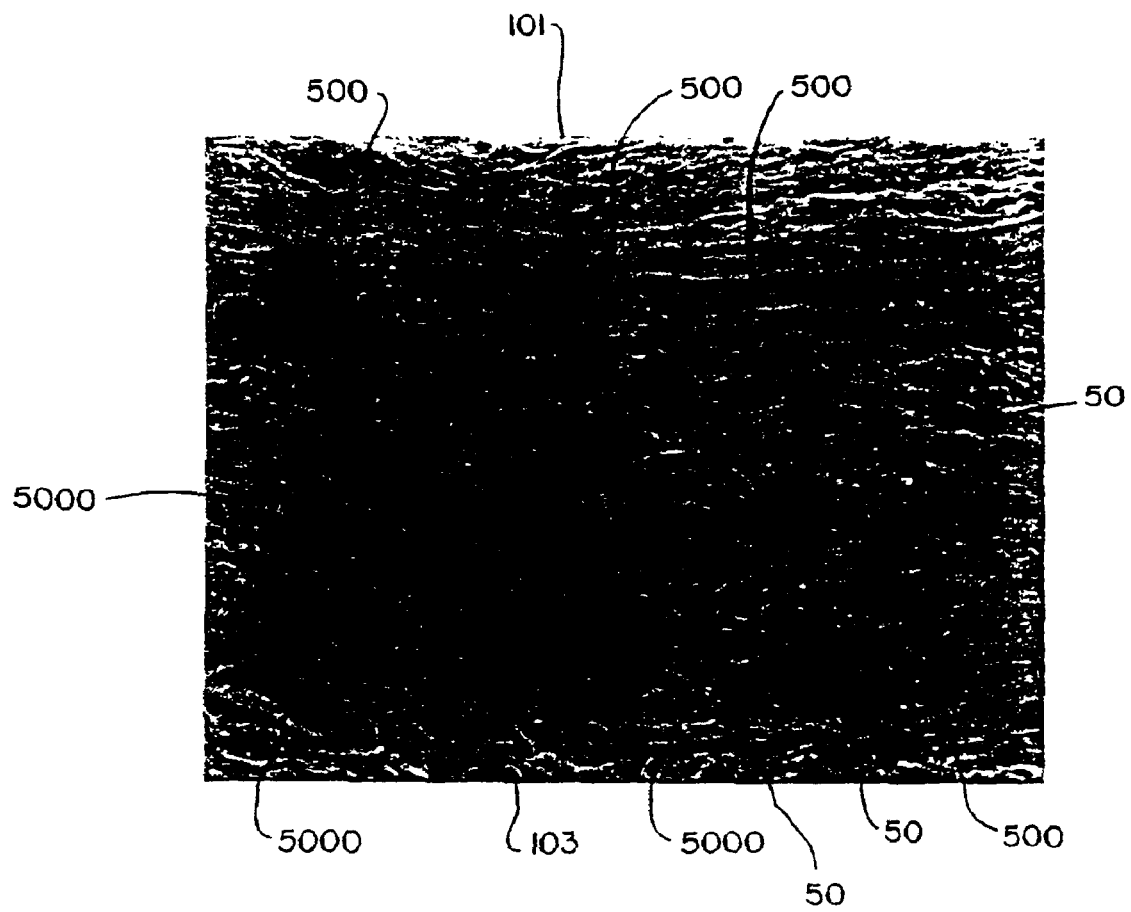
FIG. 4 is a photograph (original magnification 100×) of a planar body of flexible graphite that corresponds to the sketch of FIG. 2.
Figure 5:
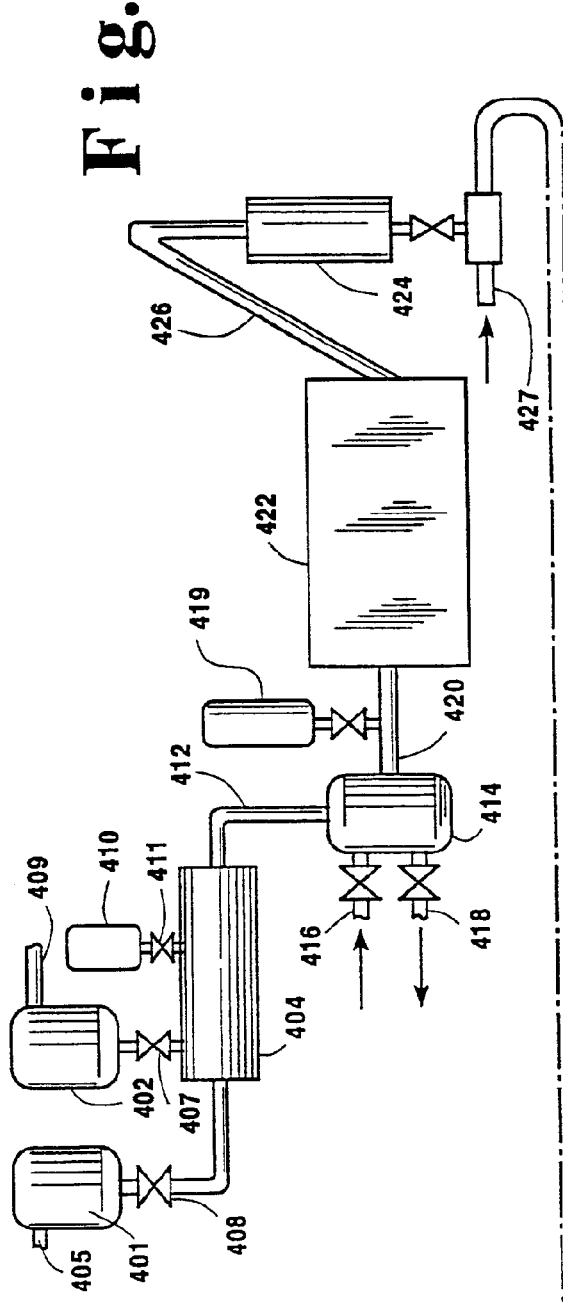
FIG. 5 shows a system for the continuous production of mechanically deformed planar flexible graphite articles.
Figure 5:
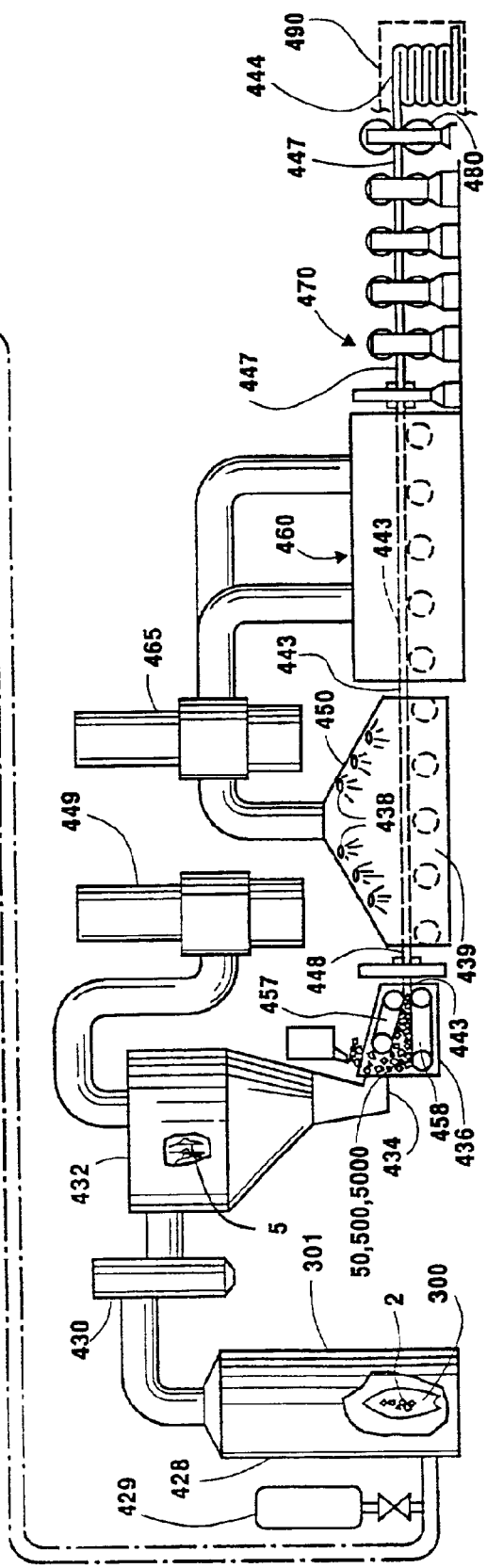

The use of continuous converging opposing belts, as shown at 457, 458 in FIG. 5, such as porous belts converging from a spacing of 25 inches to a spacing of 0.15 inch over a length of 8 to 12 feet, approximates the action of a mold and die with longer lengths, more than 8 feet providing increased conservation of omnidirectional orientation. A prior art highly densified sheet 200 of directly roll pressed intercalated acid treated graphite is illustrated in the sketch of FIG. 3 which shows the orientation of the exfoliated, expanded graphite particles 210 to be substantially parallel to the major opposed parallel surfaces 301, 303 of the planar sheet 200. FIG. 4 is a photograph of the edge of a compressed (100 lb./cu. ft.) planar article in accordance with the present invention corresponding generally to the sketch of FIG. 2 with the omnidirectionally oriented exfoliated, expanded graphite particles being correspondingly indicated at 50, 500, 5000.

Figure 2:
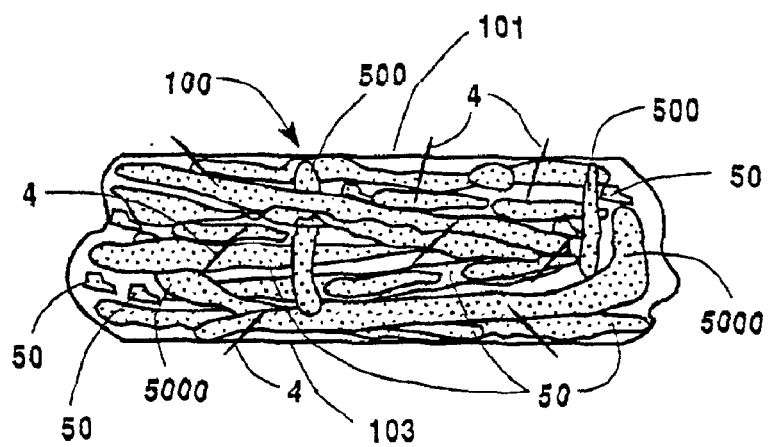
FIGS. 2, 2(A) show planar bodies of flexible graphite having portions of un-aligned graphite particles.
Figure 2A:
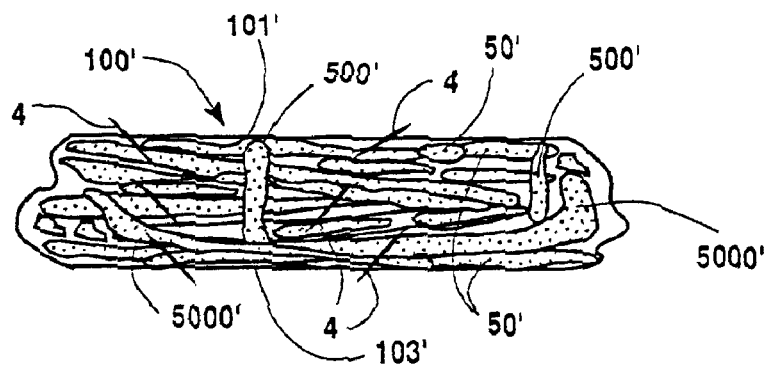
Figure 3:
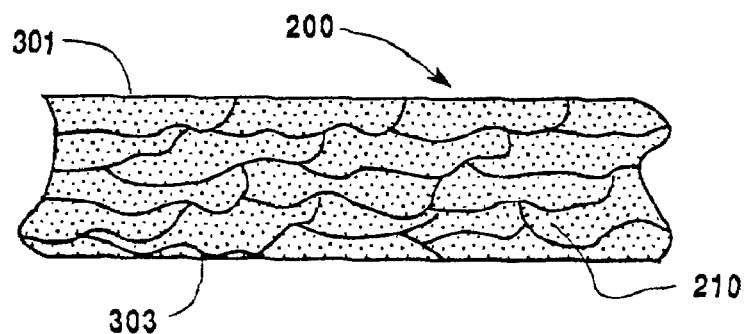
FIG. 3 shows a planar body of flexible graphite that does not have portions of un-aligned graphite particles.

The article of FIG. 3 is highly anisotropic with respect to thermal and electrical conductivity; the articles of FIGS. 2, 2(A) and 4 exhibit enhanced isotropy with respect to thermal and electrical conductivity, as compared to the article of FIG. 3.

The articles of FIGS. 2, 2(A) and the material shown in the photograph (100×) of FIG. 4 can be shown to have increased thermal and electrical conductivity in the direction transverse to opposed planar surfaces 101, 103 as compared to the thermal and electrical conductivity in the direction transverse to surfaces 301, 303 of prior art material of FIG. 3 in which particles of expanded natural graphite unaligned with the opposed planar surfaces are not optically detectable.

With reference to FIG. 5, a system is disclosed for the continuous production of roll-pressed flexible graphite sheet. In the inventive system, graphite flakes and a liquid intercalating agent are charged into reactor 404. More particularly, a vessel 401 is provided for containing a liquid intercalating agent. Vessel 401, suitably made of stainless steel, can be continually replenished with liquid intercalant by way of conduit 406. Vessel 402 contains graphite flakes that, together with intercalating agents from vessel 401, are introduced into reactor 404. The respective rates of input into reactor 404 of intercalating agent and graphite flake are controlled, such as by valves 408, 407. Graphite flake in vessel 402 can be continually replenished by way of conduit 409. Additives, such as intercalation enhancers, e.g., trace acids, and organic chemicals may be added by way of dispenser 410 that is metered at its output by valve 411.

The graphite flakes in reactor vessel 404 are subjected to interlayer attack by the acid mixture intercalant, as described in U.S. Pat. No. 3,404,061 to Shane et al. The resulting intercalated graphite particles are soggy and acid coated and are conducted (such as via conduit 412) to a wash tank 414 where the particles are washed, advantageously with water which enters and exits wash tank 414 at 416, 418. The washed intercalated graphite flakes are then passed to drying chamber 422 such as through conduit 420. Additives such as buffers, antioxidants, pollution reducing chemicals can be added from vessel 419 to the flow of intercalated graphite flake for the purpose of modifying the surface chemistry of the exfoliate during expansion and use and modifying the gaseous emissions which cause the expansion.

The intercalated graphite flake is dried in dryer 422, preferably at temperatures of about 75 to about 150° C., generally avoiding any intumescence or expansion of the intercalated graphite flakes. After drying, the intercalated graphite flakes are fed as a stream into flame 300, by, for instance, being continually fed to collecting vessel 424 by way of conduit 426 and then fed as a stream into flame 300 in expansion vessel 428 as indicated at 2. Additives such as ceramic fiber particles formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like can be added from vessel 429 to the stream of intercalated graphite particles propelled by entrainment in a non-reactive gas introduced at 427.

The intercalated graphite particles 2, upon passage through flame 300 in expansion chamber 301, expand more than 80 times in the "c" direction and assume a "worm-like" expanded form; the additives introduced from 429 and blended with the stream of intercalated graphite particles are essentially unaffected by passage through the flame 300. The expanded graphite particles may pass through a gravity separator 430, in which heavy ash natural mineral particles are separated from the expanded graphite particles, and then into a wide topped hopper 432. Separator 430 can be by-passed when not needed.

The expanded, i.e., exfoliated graphite particles fall freely in hopper 432 together with any additives, and are randomly dispersed and passed into compression station 436, such as through trough 434. Compression station 436 comprises opposed, converging, moving porous belts 457, 458 spaced apart to receive the exfoliated, expanded graphite particles 50, 500, 5000. Due to the decreasing space between opposed moving belts 457, 458, the exfoliated expanded graphite particles are compressed into a mat of flexible graphite, indicated at 448 having thickness of, e.g., from about 1.0 to 0.003, especially from about 1.0 to 0.1 inches, and a density of from about 5 to 125 lbs./ft$^3$. Gas scrubber 449 may be used to remove and clean gases emanating from the expansion chamber 301 and hopper 432.

The mat 448 is passed through vessel 450 and is impregnated with liquid resin from spray nozzles 438, the resin advantageously being "pulled through the mat" by means of vacuum chamber 439 and the resin is thereafter preferably dried in dryer 460 reducing the tack of the resin and the resin impregnated mat 443 is thereafter densified into roll pressed flexible graphite sheet 447 in calender mill 470. Gases and fumes from vessel 450 and dryer 460 are preferably collected and cleaned in scrubber 465.

The calendered flexible graphite sheet 447 is passed through surface shaping unit 480 and is mechanically deformed at its surface by embossing die stamping or the like, and thereafter heated in oven 490 to cure the resin, to continuously provide a flexible graphite sheet 444 of repeated surface altered patterns such as the grooved patterns 600 shown in FIG. 5A, which can be cut to provide flexible graphite components 650 of a fuel cell such as fluid flow plate shown at 650 in FIG. 6A or gaskets 750 as shown at 700 in FIG. 5B.

Depending on the nature of the resin system employed, and especially the solvent type and level employed, a vaporization drying step may be included prior to the surface shaping (such as embossing) step. In this drying step, the resin impregnated flexible graphite sheet is exposed to heat to vaporize and thereby remove some or all of the solvent, without effecting cure of the resin system. In this way, blistering during the curing step, which can be caused by vaopization of solvent trapped within the sheet by the densification of the sheet during surface shaping, is avoided. The degree and time of heating will vary with the nature and amount of solvent, and is preferably at a temperature of at least about 90° C. and more preferably from about 90° C. to about 125° C. for about 3 to about 20 minutes for this purpose.

The above description is intended to enable the person skilled in the art to practice the invention. It is not intended to detail all of the possible variations and modifications which will become apparent to the skilled worker upon reading the description. It is intended, however, that all such modifications and variations be included within the scope of the invention which is defined by the following claims. The claims are intended to cover the indicated elements and steps in any arrangement or sequence which is effective to meet the objectives intended for the invention, unless the context specifically indicates the contrary.

What is claimed is:

1. A system for the continuous production of surface patterned, resin-impregnated flexible graphite sheet which comprises:

(i) a reactor vessel for containing as reactants raw natural graphite particles in mixture with sulfuric and nitric acids;

(ii) an acid containing vessel communicating with said reactor vessel for the introduction of a mixture of sulfuric and nitric acid into said reactor vessel;

(iii) a graphite particle containing vessel for the introduction of graphite particles into the reactor vessel;

(iv) a first additive containing vessel communicating with said reactor vessel for the introduction of intercalation enhancing materials, acids or organic chemicals;

(v) a wash vessel containing water communicating with the reactor vessel to receive reaction product in the form of acid intercalated graphite particles and remove acid from the surface of the acid intercalated graphite particles and a portion of the mineral impurities contained in the natural graphite particles introduced into the reactor vessel;

(vi) a drying chamber for drying washed acid intercalated graphite particles;

(vii) conduit means extending from said wash vessel to said drying chamber for passing washed acid intercalated graphite particles from the wash vessel to the drying chamber;

(viii) an expansion chamber enclosing an open flame at a temperature of at least about 700° C.;

(ix) conduit means extending from said collecting vessel to said expansion chamber for passing dried acid intercalated graphite particles to said expansion chamber;

(x) gas inlet means communicating with the conduit means of (viii) for entraining the acid intercalated graphite particles in a stream of non-reactive gas and passing the entrained acid intercalated graphite particles into the open flame enclosed in said expansion chamber to cause expansion of the acid intercalated graphite particles to form vermiform elongated graphite particles;

(xi) a collecting hopper for receiving said vermiform elongated graphite particles;

(xii) a compression chamber positioned to receive vermiform graphite particles for compressing said vermiform particles into a coherent self-supporting mat of flexible graphite;

(xiii) an impregnation chamber for contacting the flexible graphite mat of (xviii) with resin and impregnating said flexible graphite with resin;

(xiv) a calender mill disposed to receive the flexible graphite mat for increasing the density of said flexible graphite mat to form a continuous flexible graphite sheet;

(xv) a device for mechanically deforming a surface of the continuous flexible graphite sheet of (xiv) to provide a series of repeating patterns on said surface flexible graphite sheet or the removal of material from said flexible graphite sheet in a series of repeating patterns; and (xvi) an oven for receiving the mat from the dryer of (xv) to cure the resin.

* * * * *